(12) United States Patent
Buchheit

(10) Patent No.: US 8,102,548 B2
(45) Date of Patent: Jan. 24, 2012

(54) VIDEO-BASED CONTROL AND DIAGNOSTICS SYSTEM

(75) Inventor: Robert Buchheit, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1470 days.

(21) Appl. No.: 11/288,145

(22) Filed: Nov. 29, 2005

(65) Prior Publication Data

US 2006/0119704 A1 Jun. 8, 2006

Related U.S. Application Data

(60) Provisional application No. 60/632,680, filed on Dec. 2, 2004.

(51) Int. Cl.
  *G06F 3/12* (2006.01)
  *G06K 15/00* (2006.01)
(52) U.S. Cl. .......................... 358/1.15; 358/1.14; 358/1.7
(58) Field of Classification Search .................. 348/143, 348/152, 155–156, 207.2
See application file for complete search history.

(56) References Cited

U.S. PATENT DOCUMENTS

| | | | | |
|---|---|---|---|---|
| 5,023,667 A | * | 6/1991 | Negoro et al. | 399/317 |
| 5,133,048 A | * | 7/1992 | Parsons et al. | 358/1.12 |
| 5,500,736 A | * | 3/1996 | Koitabashi et al. | 356/620 |
| 6,128,607 A | * | 10/2000 | Nordin et al. | 706/13 |
| 6,377,764 B1 | * | 4/2002 | Morris-jones | 399/75 |
| 6,424,371 B1 | | 7/2002 | Wen | |
| 6,788,904 B2 | | 9/2004 | York | |
| 6,863,364 B2 | * | 3/2005 | Russell et al. | 347/19 |
| 7,006,773 B2 | * | 2/2006 | Mizuno | 399/37 |
| 7,265,881 B2 | * | 9/2007 | Harris et al. | 358/504 |
| 7,577,199 B1 | * | 8/2009 | Herz | 375/240.16 |
| 7,646,401 B2 | * | 1/2010 | Lipton et al. | 348/143 |
| 2002/0089561 A1 | * | 7/2002 | Weitzel et al. | 347/19 |
| 2002/0147527 A1 | * | 10/2002 | McCall et al. | 700/245 |
| 2004/0175038 A1 | * | 9/2004 | Bonner et al. | 382/181 |
| 2005/0280703 A1 | * | 12/2005 | Narayanaswami et al. | 348/143 |
| 2006/0015569 A1 | * | 1/2006 | Rhodus et al. | 709/217 |

FOREIGN PATENT DOCUMENTS

JP 11-274608 * 10/1999

* cited by examiner

*Primary Examiner* — Dov Popovici
(74) *Attorney, Agent, or Firm* — Pillsbury Winthrop Shaw Pittman LLP

(57) ABSTRACT

A video-based control and diagnostics system for use in an imaging machines, is presented. The system may be used in a number of ways with video imaging, including diagnostic testing, monitoring paper type, motors and solenoids, providing machine access by controlling access to an imaging station such as a printer or copier through video badging or fingerprint reading. The system may further control a printer or a copier using video, optical character recognition (OCR), shape recognition, motion detection and automatic machine learning. The system may have one image processing module with ability to select from three to ten or more video sources.

17 Claims, 6 Drawing Sheets

VIDEO-BASED CONTROL AND DIAGNOSTICS SYSTEM

RELATED APPLICATION INFORMATION

This application claims priority from U.S. Provisional Application No. 60/632,680, filed on Dec. 2, 2004, and herein incorporated by reference in its entirety.

BACKGROUND OF THE INVENTION

Disclosed is a video-based control and diagnostics system for use with imaging machines. The system generally comprises at least one imaging device for detecting the condition of objects in a machine environment and a processor to analyze the visual information so received. The system may then perform diagnostics and provide instructions and/or take appropriate action.

Machines and machine parts are designed to perform a prescribed set of functions. For example, in a printing machine, such as the Xerox iGen3® (see U.S. Pat. No. 6,788,904), when the photoreceptor module undocks from the imaging stations for service, a mechanism actuates a shutter to cover a laser beam so that the worker is not harmed by it when servicing the machine. The mechanism involves various parts, including a handle, a cable and a plunger, which, through an intricate design, mechanically pushes a part to move the shutter in front of the laser beam window. It would be desirable to perform the same function without the intervening mechanism. A video-based system that "views" the undocking of the photoreceptor, could command the shutter to move the shutter by simpler means.

In the alternative, it may be desirable to provide an auxiliary system that "views" such mechanisms to ensure that the mechanisms operate properly. In particluar, it has become increasingly necessary and desirable to be able to visually monitor the condition of the various parts inside of a machine on a real time basis so that timely action can be taken before a malfunction or stoppage of the machine occurs. Additionally, it has become desirable to be able to visually monitor the environs of a machine to control access to the machine.

Although video-based display systems, such as surveillance cameras in building parlors, are known for observing motion of objects in and around certain areas, they are usually big, and generally operate in a passive mode without the ability to diagnose the consequences of the observed motion and proactively take action appropriate to what is being observed. As there is available now very small video capturing devices, some smaller than the size of a dime, the present disclosure describes a video-based system utilizing these devices strategically placed in and around a machine, such as a printing machine, and employing a method to diagnose the condition of the machine from the visual information gathered by the system.

SUMMARY OF THE INVENTION

Principles of the present invention, as embodied and broadly described herein, provide for a video-based control and diagnostics system used in imaging equipment. In one embodiment, the system comprises an imaging machine having one or more processing stations with at least one imaging device disposed about the processing stations. The imaging device is configured to survey the processing stations and generate imaging data with at least one sending unit configured to incorporate the imaging data and a receiving unit configured to receive the imaging data. The system further comprises a central processor unit configured to analyze the imaging data from one or more the imaging devices and to construct a set of instructions based on the analysis of the imaging data and a controller unit configured to transmit the set of instructions to the processing stations.

The system may further comprise a wireless unit configured to transmit a video-based signal received from at least one miniaturized video camera incorporated into the imaging machine, an antenna configured to receive the video-based signal, a receiver configured to modulate the signal, a decoder configured to decode the modulated signal, a processor to analyze the signal and construct a set of instructions, and a controller to transmit the set of instructions to the machine.

BRIEF DESCRIPTION OF DRAWINGS

The accompanying drawings, which are incorporated in and constitute a part of this Specification, depict corresponding embodiments of the invention, by way of example only, and it should be appreciated that corresponding reference symbols indicate corresponding parts. In the drawings.

DETAILED DESCRIPTION OF THE INVENTION

As will be evident by the ensuing detailed description, the present invention provides a video-based control and diagnostics system for use in imaging equipment, such as, for example, copying, xerographic, or printing equipment. The system may be used in a number of ways with video imaging, including diagnostic testing, monitoring of paper types, motors, and solenoids as well as provide machine access by controlling access to an imaging station, such as a printer or copier, through video badging or finger print reading.

The system may further control a printer or a copier using video, optical character recognition (OCR), shape recognition, motion detection and automatic machine learning. The system may have one image processing module with ability to select from three to ten or more video sources.

Figure 1:
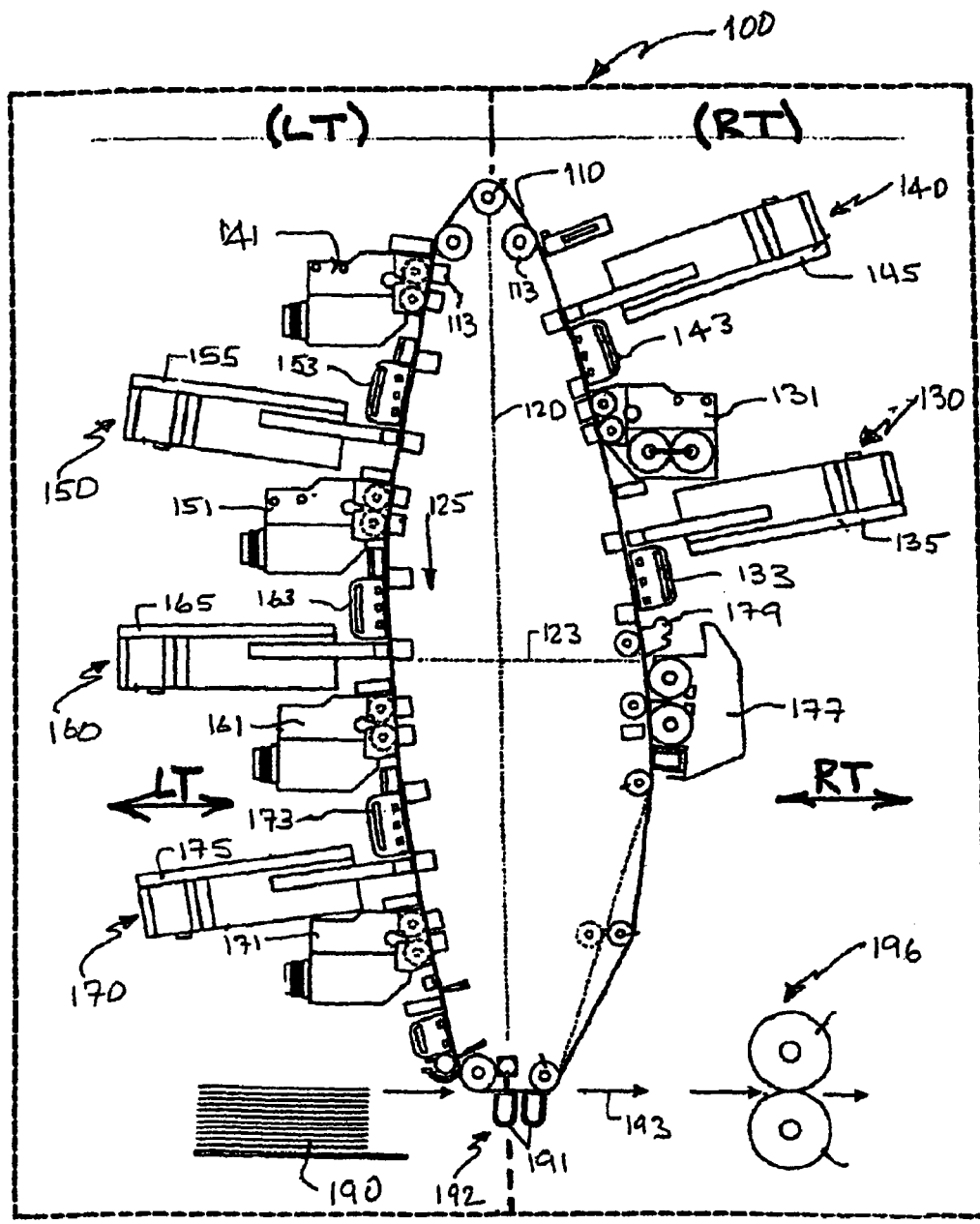
FIG. 1 is a schematic drawing showing the various processing stations of an electrostatic imaging machine.

FIG. 1 depicts an electrostatic printing machine 100, such as, for example, the Xerox iGen3®, as described in U.S. Pat. No. 6,788,904, and is herein incorporated in its entirety. The printing machine architecture shown in FIG. 1 includes, but is not limited to, five image recording stations 130, 140, 150, 160 and 170, and a photoconductive or photoreceptive belt 110 that interacts with various machine parts and mechanisms at each of the stations 130, 140, 150, 160 and 170. As described further in the embodiments below, the various complicated mechanisms which control the various processes at each of the stations 130, 140, 150, 160 and 170 may be replaced by a simpler video-based control system. In addition, the video-based control system having components at each of the stations 130, 140, 150, 160 and 170 may provide over-all diagnostic capabilities that facilitate taking preventive measures to ensure uninterrupted operation of the machine 100.

As depicted in FIG. 1, photoconductive belt 110 is elliptically shaped and has a major axis 120 (vertically oriented) and a minor axis 123 (horizontally oriented). Photoreceptor 110 advances in the direction of arrow 125 to move successive portions of the external surface of photoreceptor 110 sequentially beneath the various recording stations 130, 140, 150, 160 and 170, disposed about the path of movement thereof. Initially, photoconductive belt 110 passes through image recording station 130.

Image recording station 130 includes a charging device and an exposure device. The charging device includes a corona generator 133 that charges the exterior surface of photoconductive belt 110 to a relatively high, substantially uniform potential. After the exterior surface of photoconductive belt 110 is charged, the charged portion thereof advances to the exposure device. The exposure device includes a raster output scanner (ROS) 135, which illuminates the charged portion of the exterior surface of photoconductive belt 110 to record a first electrostatic latent image thereon.

The first electrostatic latent image is developed by developer unit 131. Developer unit 131 deposits toner particles of a selected color on the first electrostatic latent image. After the highlight toner image has been developed on the exterior surface of photoconductive belt 110, photoconductive belt 110 continues to advance in the direction of arrow 125 to image recording station 140.

The process described above is repeated at the subsequent recording stations 140, 150, 160 and 170, where second, third, fourth and fifth electrostatic latent images are recorded, then exposed by respective ROSs 145, 155, 165 and 175. Each exposure may be followed by the deposition and developing of toner particles in a variety of colors, such as, for example, magenta, yellow, cyan and black, respectively. The black toner particles form a black toner powder image which may be partially or totally in superimposed registration with the previously formed cyan, yellow and magenta toner powder images. In this manner, a multi-color toner powder image is formed on the exterior surface of photoconductive belt 110. Thereafter, photoconductive belt 110 advances the multi-color toner powder image to a transfer station, indicated generally by the reference numeral 192.

At transfer station 192, a receiving medium, i.e., paper, is advanced from stack 190 by sheet feeders (not shown) and guided to transfer station 192, where a corona generating device 191 sprays ions onto the back side of the paper. This attracts the developed multi-color toner image from the exterior surface of photoconductive belt 110 to the sheet of paper. The photoconductive belt 110 is then stripped away from the paper 190 having the toner image. A vacuum transport moves the sheet of paper 190 in the direction of arrow 193 to a fusing station 190. In the fusing operation, the toner particles coalesce with one another and bond to the sheet in image configuration, forming a multi-color image thereon. After fusing, the finished sheet is discharged to be collected at a catch tray.

In FIG. 1, the machine parts associated with recording stations 130 and 140, including a cleaning station 177 and stripping blades 179 are housed in a unit hereafter called the right tower (RT), and the components associated with recording stations 150, 160 and 170, including developer unit 141 to the left of the major axis 120 are housed in a unit called the left tower (LT). The left tower is fixed and not movable. The right tower and the photoreceptor module are both movable such that they can be floatingly docked to the left tower. The towers are shown schematically in phantom outline in FIG. 1.

It will be apparent to those skilled in the art that the undocking of the right tower and the photoreceptor module and belt 110 provides access to the various components of the system for service and diagnostic purposes. The system also has various electrical interlocks (not shown) to assure safety from laser beams discharging from the raster output scanners 135, 145, 155, 165 and 175 when in the undocked position.

It will also be evident from FIG. 1 that there are several electro-mechanical devices that function in certain coordinated ways to make the printing machine work properly. For example, when photoconductive belt 110 is undocked, a shutter blocks the laser beam so that the worker can service the tower without being exposed to hazardous radiation. As explained below with respect to FIGS. 2a and 2b, the mechanism that assures the rendering of the ROS unharmful when photoconductive belt 110 is undocked is relatively complicated, and may be replaced by a simpler and more effective video-based system that is explained further in FIG. 3.

Figure 2A:
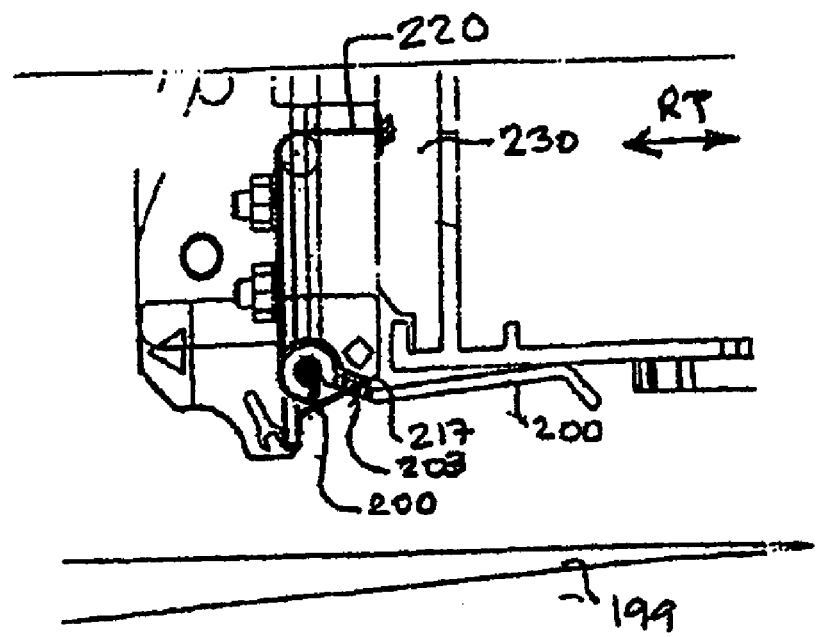
FIGS. 2a and 2b show the operation of a shutter actuator in the printing machine of FIG. 1.
Figure 2B:
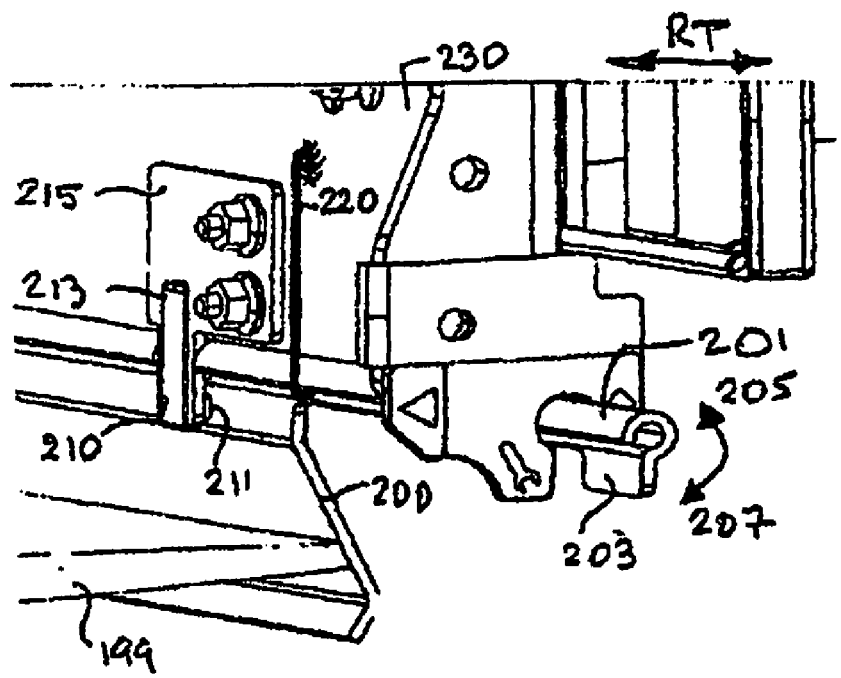

The mechanism shown in FIGS. 2a and 2b involves a semi-automatic mechanical Raster Output Scanner (ROS) shutter 200 (see, patent application Ser. No. 10/990,564, filed on 17 Nov. 2004, now U.S. Pat. No. 7,212,221). ROS shutter 200 is actuated by a cable assembly 220 to block the beam 199. In FIG. 2a, ROS shutter 200 is in the up position, leaving the laser beam 199 unblocked and, therefore, in operational mode. Cable 220 is attached, for purposes of illustration here, to the corona generator or charge unit 173 of FIG. 1.

Since the charge unit mount rail (represented by reference numeral 230 in FIGS. 2a and 2b) remains stationary during undocking, the charge unit will move to the right a short distance as the right tower and the photoreceptor are undocked. This movement pulls cable 220, which in turn rotates the shaft 201 of which lever 203 is a part, thereby causing a shutter blade to move clockwise downwardly to block the laser beam 199, as shown in FIG. 2b. This action puts the machine in service mode to service the machine in real time with no shut down and without any concern for exposure to radiation from the laser.

After service, the photoconductive belt 110 may be docked against the tower (shown in FIG. 1) while at the same time relieving the tension in cable 220. Since shaft 201 is no longer restrained by cable 220, the operator or a service technician can selectably rotate lever 203 to up 205 position to unblock beam 199 and proceed with the normal operation of the printing machine.

It will be noted that the function of cable 220 in FIG. 2a is to establish the position of the shutter on the ROS depending upon the position of the photoreceptor with respect to the position of the movable tower. This function can easily be performed by a video receptor, or camera, mounted at a place that is suitable on the photoconductive belt module 110' or on one of the two towers. When the video camera "sees" the undocking, it could signal the shutter on the ROS to block the laser beam.

Figure 3A:
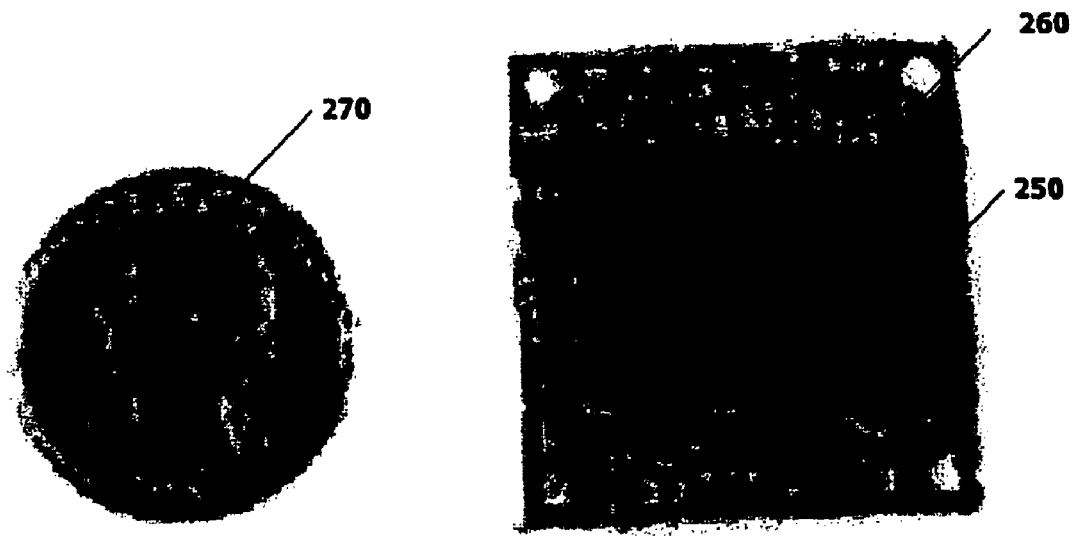
FIGS. 3a and 3b are photographs of miniaturized video cameras that are available today.
Figure 3B:
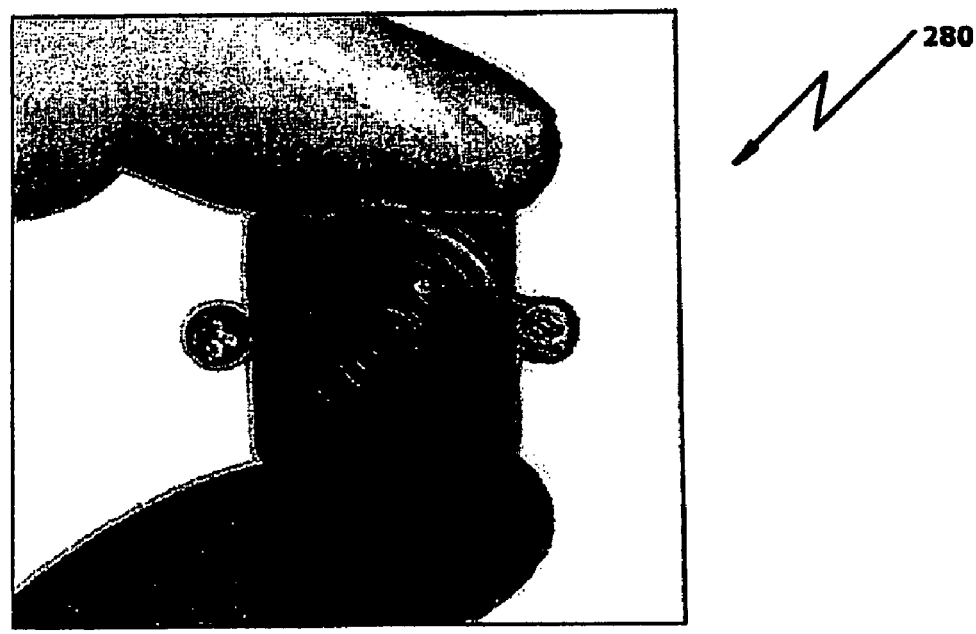

FIG. 3a illustrates an exemplary 1 lux, black and white pinhole camera 250, with a 420 line resolution, mounted on its own circuit board 260 having light sensing devices, such as, for example, charge coupled devices (CCD). The color version has 330 line resolution and a 2 lux rating. Another miniaturized video camera, as shown in FIG. 3b, is made by SVAT Industries. At a size comparable to a dime 270, these cameras can also operate on a battery. Wireless versions equipped with an antenna are also available.

Figure 4:
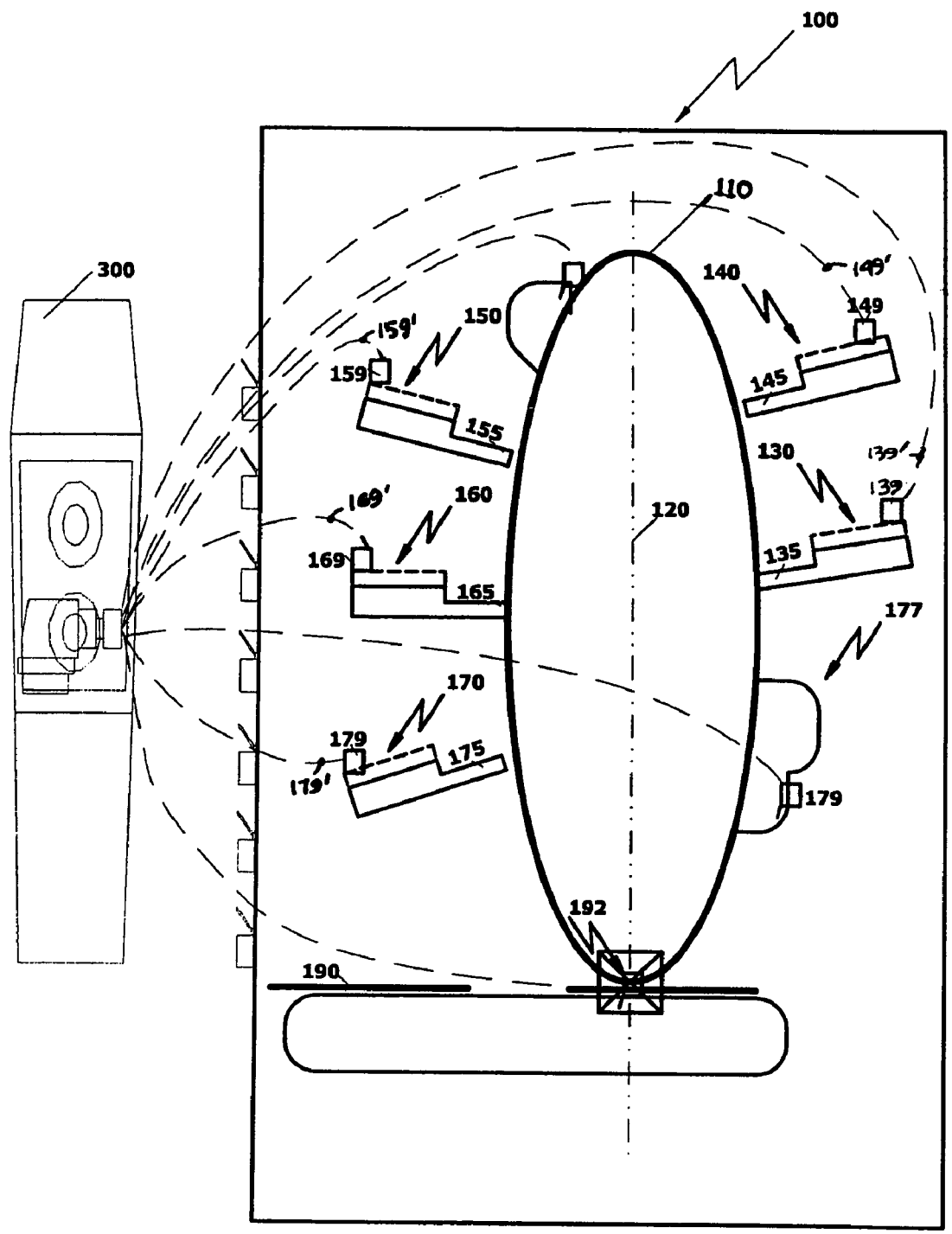
FIG. 4 is a drawing of an embodiment showing a wired video-based control and diagnostics system utilizing one or more video cameras.

FIG. 4 illustrates the incorporation of miniaturized video cameras (MVCs) into the imaging machine 100 of FIG. 1, constructed and operative in accordance with an embodiment of the present invention. It is to be noted that reference numerals similar to those used in FIG. 1, refer to similar parts. Recording stations 130, 140, 150, 160 and 170 are shown arranged about the photoreceptor 110 similar to the arrangement shown in FIG. 1. Each of the recording stations 130, 140, 150, 160 and 170 has a charging device and an exposure device, of which only the latter, namely ROSs, 135, 145, 155, 165 and 175 are shown for reference. As described before, each of the ROSs 135, 145, 155, 165 and 175 includes an intricate mechanism (FIGS. 2a and 2b) for covering the laser beam of the ROS during servicing the machine while the photoreceptor is undocked from the corresponding towers shown in FIG. 1.

The embodiment depicted in FIG. 4 shows placement of miniaturized video cameras (MVCs) 139, 149, 159, 169 and 179, which either obviate the need for mechanisms such as shown in FIGS. 2a and 2b or provide a system for ensuring the proper operation of such mechanisms. Each of the MVCs 139, 149, 159, 169 and 179 is capable of surveying or viewing the photoconductive belt 110 for areas proximate to the towers and can therefore detect the docking and undocking of the photoconductive belt 110.

In addition, each of the MVCs 139, 149, 159, 169 and 179 are configured to visually capture the surveyed areas and produce and convey video data in a form that can drive a video monitor. For example, each of the MVCs 139, 149, 159, 169 and 179 may be configured to generate voltage levels that represent scanlines of the imaged area, as well as synchronization information and color information to complete the video data. The video data may then be conveyed to a computer for processing.

To this end, as indicated in FIG. 4, the MVCs 139, 149, 159, 169 and 179 may be communicatively coupled to a computer 300 via transmission lines 139', 149', 159', 169 and 179' to accommodate the transfer of the video data from the MVCs to computer 300. Computer 300 may be configured to process the video data transmitted by the MVCs 139, 149, 159, 169 and 179, via the transmission lines 139', 149', 159', 169 and 179'. Computer 300 may also be configured to store the transmitted video data in the computer's memory, such as, for example, as a video data map. That is, numerical values representing image intensity of the video data may be stored in different memory locations. By knowing how the video data is mapped, any portion of the stored image can be accessed, utilized, and operated on as desired. In addition, computer 300 may also be configured with pattern recognition capabilities that can read, interpret, monitor, and/or act on the stored numerical values.

Transmission lines 139', 149', 159', 169 and 179' may also be used to accommodate the transfer of commands or other communications from computer 300 to the MVCs or other machine parts. In some embodiments, electrostatic printing machine 100 may be equipped with a master controller or processor and a plurality of slave controllers or processors that are configured to monitor and control a designated machine part, such as, for example, a paper feeding mechanism, or an MVC. In FIG. 4, the master controller and slave controllers may be integrated with recording stations 130, 140, 150, 160 and 170. The master controller is configured to communicate with, collect information from, and issue command instructions to, the slave controllers via transmission lines 139', 149', 159', 169 and 179'. The slave controllers may also communicate with each other via transmission lines 139', 149', 159', 169 and 179'.

By way of example, the master controller may issue a command, via one or more of the transmission lines 139', 149', 159', 169 and 179', to the slave controller responsible for the paper feeding mechanism, to feed the paper. In turn, the slave controller would track the paper, determine whether the paper supply has been exhausted, provide the necessary timing signals, and other control information. Similarly, the master controller may also issue command instructions to computer 300, via one or more of the transmission lines 139', 149', 159', 169 and 179', to check the state of the laser shutters. Computer 300 would then communicate with the appropriate slave controller(s) to determine whether the shutters are open or closed and then transmit the status of the shutters back to the master controller based on the communication received from the slave controller(s). The master controller may then issue commands based on the shutter status information or a different controller also reading the messages, could respond to the shutter status information.

In the exemplary case with the ROSs 135, 145, 155, 165 and 175, computer 300 would send command instructions to close the shutter by releasing a magnetic latch (not shown), for example, when the video data received from one of the MVCs 139, 149, 159, 169 and 179 confirms the undocking of the photoconductive belt 110 for service, and then instruct the shutter to unblock the laser beam when the photoconductive belt 110 is docked into position. It would be understood that other mechanisms may be employed to actuate the shutter without the need for complex mechanism shown in FIGS. 2a and 2b.

Figure 5:
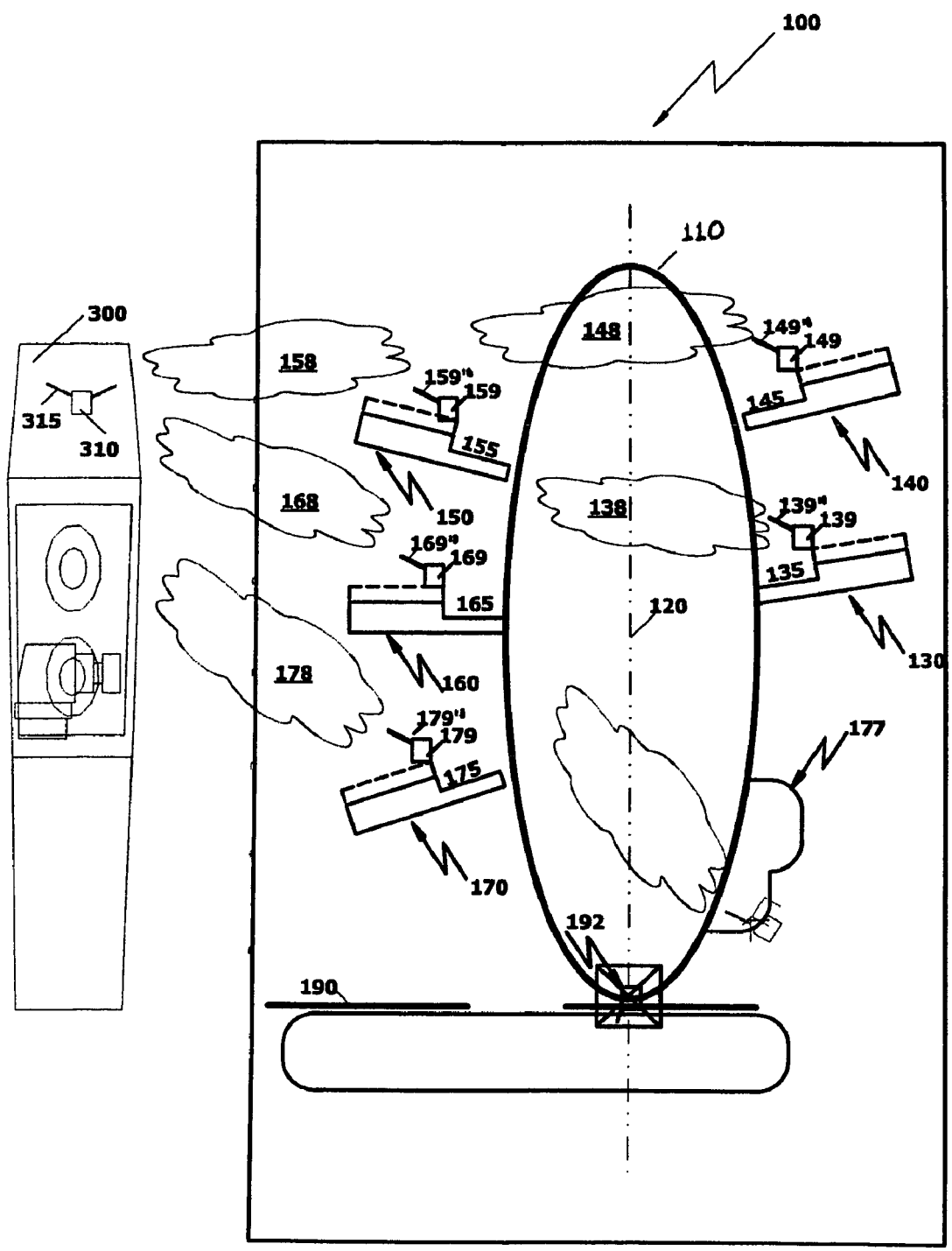
FIG. 5 is a drawing of another embodiment showing a wireless video-based control and diagnostics system utilizing one or more video cameras.

FIG. 5 illustrates miniaturized wireless video cameras (MWVCs) 139, 149, 159, 169 and 179 equipped with antennas 139", 149", 159", 169" and 179" that communicate with computer 300 wirelessly, in accordance with a related embodiment of the present invention. That is, computer 300 is configured with a transceiver unit 310 that also includes antenna 315, as shown in FIG. 5. Communication between the MWVC antennas 139", 149", 159", 169" and 179" and transceiver antenna 315, including the transmission and reception of video data, takes place through wireless radio-wave communications, schematically represented by "clouds" 138, 148, 158, 168 and 178. It will be appreciated that such communications would be designed to operate in accordance with wireless communication schemes and protocols, such as for example, Wi-Fi, Bluetooth, etc.

In a related embodiment of the present invention, receiver/transmitter unit 310 may be configured to work in conjunction with a receiver array 313 and detector array 317 in computer 300 in order to process the video data from and to control each of the MWVCs and/or other parts of the machine 100 of FIG. 1. Computer 300 may include processor circuitry for processing data as received from units 139, 149, 159, 169 and 179 through unit 310. It will be understood that whether the video data supplied to computer 300 is transmitted through wires 139', 149', 159', 169' and 179' (as in FIG. 4) or wirelessly through 139", 149", 159", 169" and 179" (as in FIG. 5), the video data is analyzed in a similar manner by computer 300.

Figure 6:
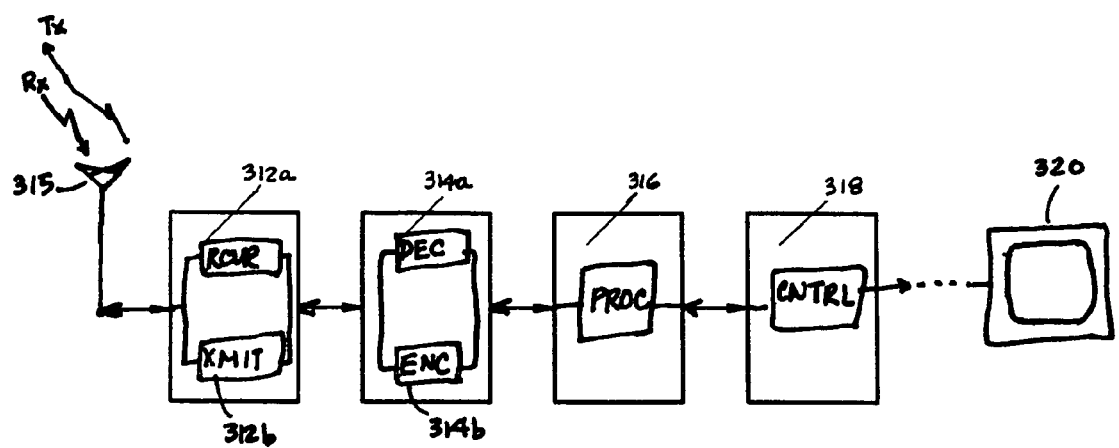
FIG. 6 is a block diagram showing the circuitry for a transceiver unit used in the systems of FIGS. 4 and 5.

A functional block diagram of the circuitry used for controlling transceiver unit 310 is shown in FIG. 6. Antenna 315 of computer transceiver unit 310 is impedance and frequency-matched to receive the wireless signals, containing the video data, transmitted by the MWVCs 139, 149, 159, 169 and 179 of FIG. 5. For the receiver chain, as shown in FIG. 6, unit 310 includes receiver portion 312a configured to amplify, frequency convert, and demodulate the wireless signals received by antenna 315 to extract the video data. The demodulated signals are then supplied to a decoder portion 314a, which decodes the signals, in accordance with the pre-specified wireless protocol, and translates the signals into digital video data. Processor 316 then processes and analyzes the digital video data for use by computer 300 to construct a set of instructions based on the analysis of the video data. Controller unit 318 may then transmit the set of instructions to the processing stations.

Computer 300 may also include processing circuitry 320 that receives the outputs from the video receiver and detector arrays 313 and 317, respectively. Although not shown, video receiver units (having array 315) and detector array units (having array 317) may be circuitized to include analog and/or digital circuitry, for conditioning, selecting and latching the outputs from each of the MVCs or MWVCs through unit 310. In one embodiment, computer 300 may be configured to select from and control ten or more MVCs or MWVCs with a single image processing unit. Processing circuitry 320 can include one or more microprocessors. The information supplied by processing circuitry 320 (e.g., the selected video output) is input to analyzer 330. In addition, it may be desirable to provide optional video compression circuitry 340 for compressing video data being transmitted 350. Various types of analyzers, transmitters and compression circuits can be used and many types of these circuits are well known in the art. Therefore, these features will not be described in more detail (see, e.g., U.S. Pat. No. 6,424,371 to S. H. Wen).

Finally, for the receiver chain, monitor 320, coupled to computer 300, may be used to display the processed digital video data.

Conversely, for the transmitter chain, as shown in FIG. 6, instructions for the processing stations may be supplied to an encoder portion 314b to encode the instructions in accordance with the pre-specified wireless protocols. The encoded instructions are then supplied to a transmitter portion 312b to modulate and frequency convert the instructions into wireless signals suitable for transmission. The wireless signals are then radiated, via antenna 315, to processing stations.

It will be understood that the video-based system embodiments disclosed above may be implemented for different parts of a printing machine, such as shown in FIG. 1. For example, miniaturized video cameras, or MVCs shown in FIGS. 3a and 3b may be distributed to other parts of the machine, including paper feeder stations. The paper type can then be monitored through video imaging. MVCs may monitor motors and solenoids (not shown) employed throughout the printing machine of FIG. 1. For example, stepping motor shafts can be tagged with a fiduciary mark which can be continually monitored with a miniaturized video camera, MVC, and the state of steps and useful life can be projected with a diagnostic program. Similarly, a MVC can be used to monitor the presence or absence of paper in a paper tray of a printing machine. In one embodiment, the MVC is used in conjunction with a temperature sensing liquid crystal to monitor temperature sensitive areas in a printing machine.

Furthermore, video-based surveillance may be used to control access to printing machines. Other implements, such as badges and fingerprint reading may be incorporated to the video-based imaging system shown in FIGS. 5 and 6. The microprocessors in the computer may be used for optical character recognition (OCR) of documents, motion detection.

The embodiments described provide a semi-autonomous control system in digital copiers and printers. The control system can be standardized for various functions so that it can be used in different products without large-scale redesign. The system can be trained rather than programmed, thus providing a "smart" system. For example, if a part is to be observed for motion, the trainer can select that part as viewed on a video monitor and mark it for continued monitoring. The camera can also be trained to recognize different identifications (IDs), including its own ID. Each MVC can respond to a different ID in a multiplexed system.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. A video-based control and diagnostic system in a printing machine, comprising:
    at least one video device disposed proximate to at least one processing station of a plurality of processing stations housed within a common structure of the printing machine, the at least one video device being configured to survey areas around the at least one processing station and generate video data;
    at least one transmission unit configured to transmit the video data;
    a receiving unit configured to receive the transmitted video data;
    a computer configured to analyze the video data to determine whether the at least one processing station is being accessed, and to construct a set of instructions based on the analysis of the video data; and
    a controller unit configured to transmit the set of instructions to close a shutter of the at least one processing station.

2. The system in accordance with claim 1, wherein said at least one processing station comprises a charger unit and an exposure unit.

3. The system in accordance with claim 2, wherein said exposure unit comprises a raster output scanner (ROS).

4. The system in accordance with claim 1, wherein said video device comprises a video camera.

5. The system in accordance with claim 1, wherein said transmission unit comprises a transmission line.

6. The system in accordance with claim 1, wherein said transmission unit comprises an antenna.

7. The system in accordance with claim 1, wherein said set of instructions comprises a video-based command to a mechanism of an imaging machine of the printing machine.

8. The system in accordance with claim 1, wherein said shutter is a laser beam shutter actuator.

9. The system in accordance with claim 1, wherein said set of instructions comprises a video-based diagnostic test result to be displayed on a monitor.

10. The system in accordance with claim 1, wherein said set of instructions comprises a video-based command to provide access to an imaging machine of the printing machine.

11. The system in accordance with claim 1, wherein said set of instructions comprises a video-based optical character recognition of a document.

12. The system in accordance with claim 1, wherein said set of instructions comprises a video-based motion detection of a part of an imaging machine of the printing machine.

13. The system in accordance with claim 1, wherein said set of instructions comprises a video-based automatic machine learning codes.

14. The system in accordance with claim 1, wherein said set of instructions comprises a video-based checking for alignment of fiduciary marks on a part of an imaging machine of the printing machine.

15. The system in accordance with claim 1, wherein said set of instructions comprises a video-based checking for temperature sensitive areas in an imaging machine of the printing machine.

16. The system in accordance with claim 1, further comprising a wireless unit, including:
- an antenna configured to receive the transmitted video data;
- a receiver portion configured to demodulate the transmitted video data; and
- a transmitter portion configured to wirelessly transmit the set of instructions.

17. A printing machine comprising:
- one or more processing stations disposed along a photoconductive belt of the printing machine, each processing station including a shutter configured to shield optical access thereto;
- a video-based control and diagnostic system in the printing machine comprising at least one video device disposed proximate to at least one processing station of the one or more processing stations in which the at least one video device is configured to survey areas around the at least one processing station and generate video data;
- at least one transmission unit configured to transmit the video data;
- a receiving unit configured to receive the transmitted video data;
- a computer configured to analyze the video data to determine whether the photoconductive belt is being uncoupled from the at least one processing station, and to construct a set of instructions based on the analysis of the video data to close the shutter of the at least one processing station; and
- a controller unit configured to transmit the set of instructions to the at least one processing station.

* * * * *